(12) United States Patent
Sakamoto

(10) Patent No.: US 6,825,457 B2
(45) Date of Patent: Nov. 30, 2004

(54) TWO-DIMENSIONAL BEAM WRITING POSITION DETECTING DEVICE AND IMAGE FORMING APPARATUS USING THE DETECTING DEVICE

(75) Inventor: Junshin Sakamoto, Ibaraki (JP)

(73) Assignee: Hitachi Printing Solutions, Ltd., Ebina (JP)

(*) Notice: Subject to any disclaimer, the term of this patent is extended or adjusted under 35 U.S.C. 154(b) by 221 days.

(21) Appl. No.: 10/085,583

(22) Filed: Mar. 1, 2002

(65) Prior Publication Data

US 2002/0121593 A1 Sep. 5, 2002

(30) Foreign Application Priority Data

Mar. 2, 2001 (JP) .................................. P.2001-058525

(51) Int. Cl.$^7$ ................................................ H01J 3/14
(52) U.S. Cl. ................................................ 250/236
(58) Field of Search ............................... 250/236, 234; 358/474, 481; 347/246, 250

(56) References Cited

U.S. PATENT DOCUMENTS

| | | | |
|---|---|---|---|
| 4,864,326 A | 9/1989 | Kawamura et al. | 347/240 |
| 4,933,549 A | 6/1990 | Fujioka et al. | 250/235 |
| 5,576,852 A | 11/1996 | Sawada et al. | 358/475 |
| 5,786,594 A | * 7/1998 | Ito et al. | 250/236 |

FOREIGN PATENT DOCUMENTS

EP 1 024 012 A2 1/2000

OTHER PUBLICATIONS

European Search Report dated Jun. 21, 2002.

* cited by examiner

Primary Examiner—Thanh X. Luu
(74) Attorney, Agent, or Firm—McGinn & Gibb, PLLC

(57) ABSTRACT

A two-dimensional beam writing position detecting device for providing an optical system for scanning on a photoconductor by laser beams emitted from a semiconductor laser to form an electrostatic latent image and arranging a plurality of the laser beams in two dimensions and slantingly scanning each the laser beam for forming the electrostatic latent image on the photoconductor at a predetermined angle and detecting the laser beams for determining the first writing position on the photoconductor of the laser beams is characterized in that a longitudinal direction of a beam light receiving surface of the detecting device 1 inclines at the substantially same angle as the slant scanning angle with respect to the perpendicular of a scanning direction of the plural beams.

23 Claims, 5 Drawing Sheets

TWO-DIMENSIONAL BEAM WRITING POSITION DETECTING DEVICE AND IMAGE FORMING APPARATUS USING THE DETECTING DEVICE

BACKGROUND OF THE INVENTION

1. Field of the Invention

The present invention relates to an image forming apparatus such as a laser beam printer for doing printing by scanning light of a laser beam and an electrophotographic process, and particularly to a two-dimensional beam writing position detecting device used therein.

2. Description of the Related Art

A conventional laser beam printer performs exposure of a semiconductor laser in binary of ON and OFF, and forms an electrostatic latent image of an image on a photoconductive drum. At this time, a beam detector is provided in a position on beam scanning and other than on a scanning line of a photoconductor in order to determine a writing position on the photoconductor. A high-speed type PIN photodiode is used in this beam detector since a fast response is highly required.

In recent years, a speedup in a printing speed of a printer advances and a semiconductor laser becomes multiple beams and a method of scanning by plural lines is considered, and when a light source of the semiconductor laser is arranged, for example, in two dimensions with three by three (nine), plural beams are scanned in a beam detector.

Hence, when a slit is provided in the front of the beam detector and scanning is performed at a distance between each the beam sufficiently wider than a width of the slit, detection can be performed, but due to restrictions on an optical system and the distance between the beams for scanning a photoconductor and so on, as shown in FIG. 1 described below, it becomes an arrangement so that the beams of the second and subsequent rows overlap with the beam of the first row with respect to a sub-scanning direction, and at least two or more beams overlap on a photodetector of the beam detector in the sub-scanning direction even when the slit is provided.

Generally, by converting an optical signal detected by the photodetector into a voltage signal and comparing a rise portion of this voltage with a reference voltage, a signal for determining a writing position on the photoconductor is obtained, but as described above, the plural beams overlap within the slit at a time difference, so that each the beam cannot be split.

A waveform in the case of making a voltage conversion of an output from the beam detector when scanning is performed at a slight distance (distance by a radius of the beam) of the sub-scanning direction is shown in FIG. 8. As shown in the drawing, since distortion (stepwise waveform) occurs in a rise voltage of an optical signal, a detection signal of a beam B1 is obtained at a level of a reference voltage 1 (reference level 1), but light of beams B1, B4, B7 overlaps at levels of reference voltages 2, 3 (reference levels 2, 3) and positions of the original beams B4, B7 (original detection position) cannot be detected, so that problems that a writing position of the beam cannot becomes unstable etc. occurred.

SUMMARY OF THE INVENTION

An object of the invention is to provide a two-dimensional beam writing position detecting device capable of eliminating a disadvantage of such a conventional art and splitting writing signals of each beam of a two-dimensional laser diode for performing multiple beam scanning by one beam detector and determining a writing position on a photoconductor, and an image forming apparatus using the detecting device.

In order to achieve the object, first means is a two-dimensional beam writing position detecting device for providing an optical system for scanning on a photoconductor by laser beams emitted from a semiconductor laser to form an electrostatic latent image and arranging a plurality of the laser beams in two dimensions and slantingly scanning each the laser beam for forming the electrostatic latent image on the photoconductor at a predetermined angle ($\theta$) and detecting the laser beams for determining the first writing position on the photoconductor of the laser beams, characterized in that a longitudinal direction of a beam light receiving surface of the detecting device inclines at the substantially same angle ($\theta 1$) as the slant scanning angle ($\theta$) with respect to the perpendicular of a scanning direction of the plural beams.

Second means of the present invention is characterized in that in the first means, the angle ($\theta 1$) of inclination of the longitudinal direction in the beam light receiving surface of the detecting device is within the range represented by the following expression.

$$\theta 1 = \theta \pm \tan^{-1}[\text{a beam radius}/(P2 \times \text{the number of beams of a primary scanning direction})]$$

where P2 in the expression is a beam pitch of a sub-scanning direction.

Third means of the present invention is characterized in that in the first or second means, a length S1 of a laser beam sub-scanning direction of the beam light receiving surface of the detecting device is more than or equal to a value in which a beam diameter is added to a value in which a beam pitch P2 of the sub-scanning direction is multiplied by [(the number of beams of the sub-scanning direction)−1], and a length S2 of a laser beam scanning direction of the beam light receiving surface is less than [(a beam pitch P1 of the scanning direction)−(a beam diameter)].

Fourth means of the present invention is characterized in that in any of the first to third means, the beam light receiving surface of the detecting device is partitioned and formed by a slit.

Fifth means of the present invention is characterized in that in any of the first to third means, the beam light receiving surface of the detecting device is formed by a photodetector.

Sixth means of the present invention is characterized in that a signal detected by a scanning direction beam of the first row or the plurality-th row on a beam light receiving surface of the detecting device is formed into a writing position signal on a photoconductor of the scanning direction beam of the first row, and a writing position signal on the photoconductor of the scanning direction beam of the second or subsequent row is formed into a signal in which a particular delay or lead is provided so that a scanning direction writing position on the photoconductor matches with the beam of the first row with respect to the signal obtained by the above.

Seventh means of the present invention is a two-dimensional beam writing position detecting device for providing an optical system for scanning on a photoconductor by laser beams emitted from a semiconductor laser to form an electrostatic latent image and arranging a plurality of the semiconductor laser beams in two dimensions and slantingly scanning each the laser beam for forming the electrostatic latent image on the photoconductor at a predetermined angle (θ) and detecting the laser beams for determining the first writing position on the photoconductor of the laser beams, and is characterized in that a signal detected by a scanning direction beam of the first row or the plurality-th row on a beam light receiving surface of the detecting device is formed into a writing position signal on the photoconductor of the scanning direction beam of the first row, and a writing position signal on the photoconductor of the scanning direction beam of the second or subsequent row is formed into a signal in which a particular delay or lead is provided so that a scanning direction writing position on the photoconductor matches with the beam of the first row with respect to the signal obtained by the above.

Eighth means of the present invention is characterized in that a two-dimensional beam writing position detecting device is installed in a position on beam scanning and other than on a scanning line of the photoconductor.

DETAILED DESCRIPTION OF THE PREFERRED EMBODIMENTS

Figure 6:
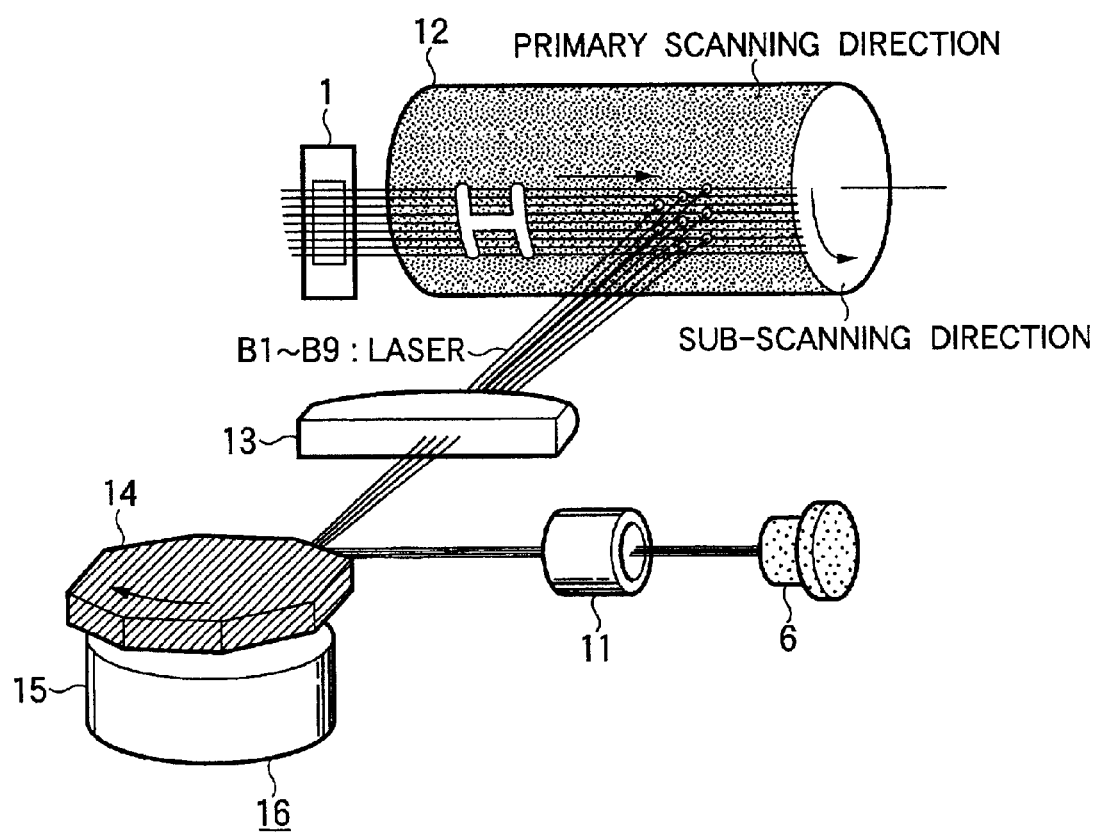
FIG. 6 is a configuration diagram of an optical system of a laser printer according to an embodiment of the present invention.

An embodiment of the present invention will be described below with reference to the drawings. FIG. 6 is a configuration diagram of an optical system in a laser printer according to the embodiment. A semiconductor laser array 6 is constructed of nine laser diodes in a two-dimensional array with three by three and nine beams are emitted. The nine beams pass through a collimator lens 11 and reach a polygon mirror 14. The polygon mirror 14 is driven by a driving motor 15 at high-speed rotation with a small speed variation of the polygon mirror.

A scanner motor 16 constructed of the polygon mirror 14 and the driving motor 15 deflects and scans the nine beams. The scanned nine beams pass through an a spherical lens 13 and reach a drum-shaped or belt-shaped photoconductor 12 and the photoconductor 12 is scanned in a primary scanning direction. In this case, the semiconductor laser array 6 is fixed at an angle so that the nine beams are arranged slantingly on the photoconductor 12 at a particular pitch (about 42 μm for 600 dpi).

On-off control of the semiconductor laser array 6 is performed on the basis of print data and the photoconductor 12 rotates in a sub-scanning direction and thereby, an electrostatic latent image is formed on the photoconductor 12 as shown in the drawing. The collimator lens 11 and the a spherical lens 13 are used for stopping down the beams on the photoconductor 12 in a constant state.

A beam detector 1 is provided in a position on beam scanning and other than a scanning width of the photoconductor 12 in order to determine a beam writing position on the photoconductor 12, and a high-speed type PIN photodiode is used since a fast response is highly required.

Figure 7:
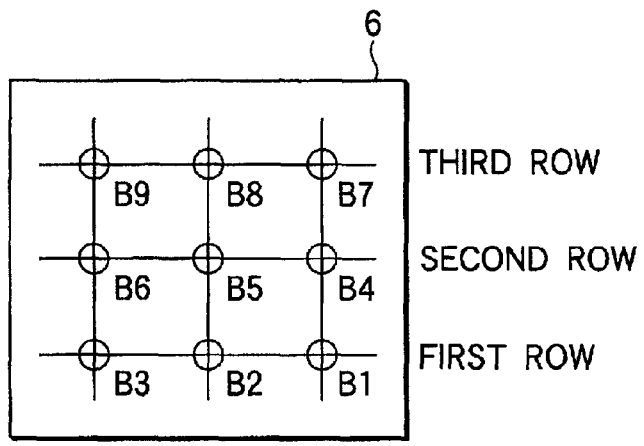
FIG. 7 is a diagram showing a beam arrangement example by a semiconductor laser array.
Figure 8:
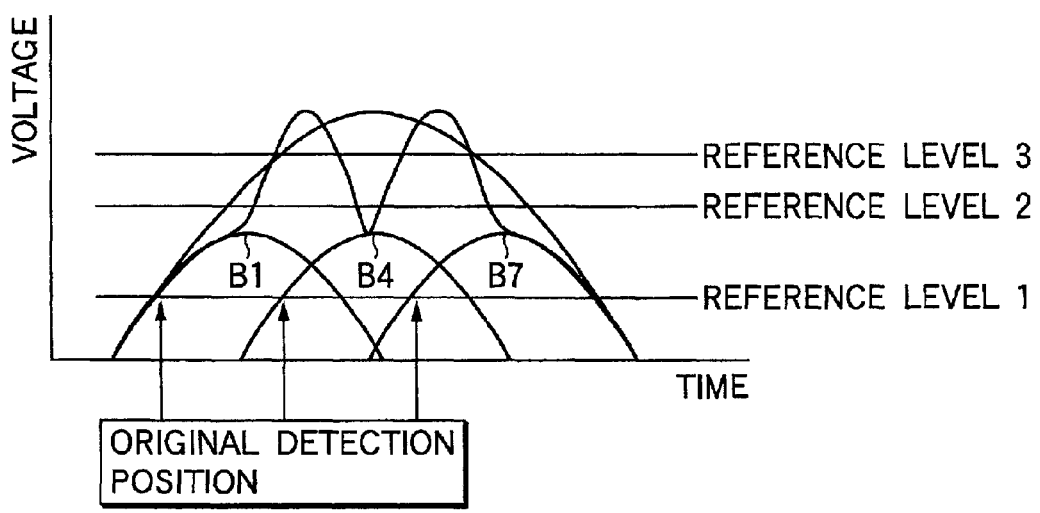
FIG. 8 is a waveform chart in the case of making a voltage conversion of an output from a beam detector when scanning is performed at a slight distance of a sub-scanning direction.

FIG. 7 is a diagram showing one example of beam arrangement with three by three of the semiconductor laser array 6, and as shown in the diagram, beams B1 to B3 are emitted in the first row and beams B4 to B6 are emitted in the second row and beams B7 to B9 are emitted in the third row, respectively.

Figure 1:
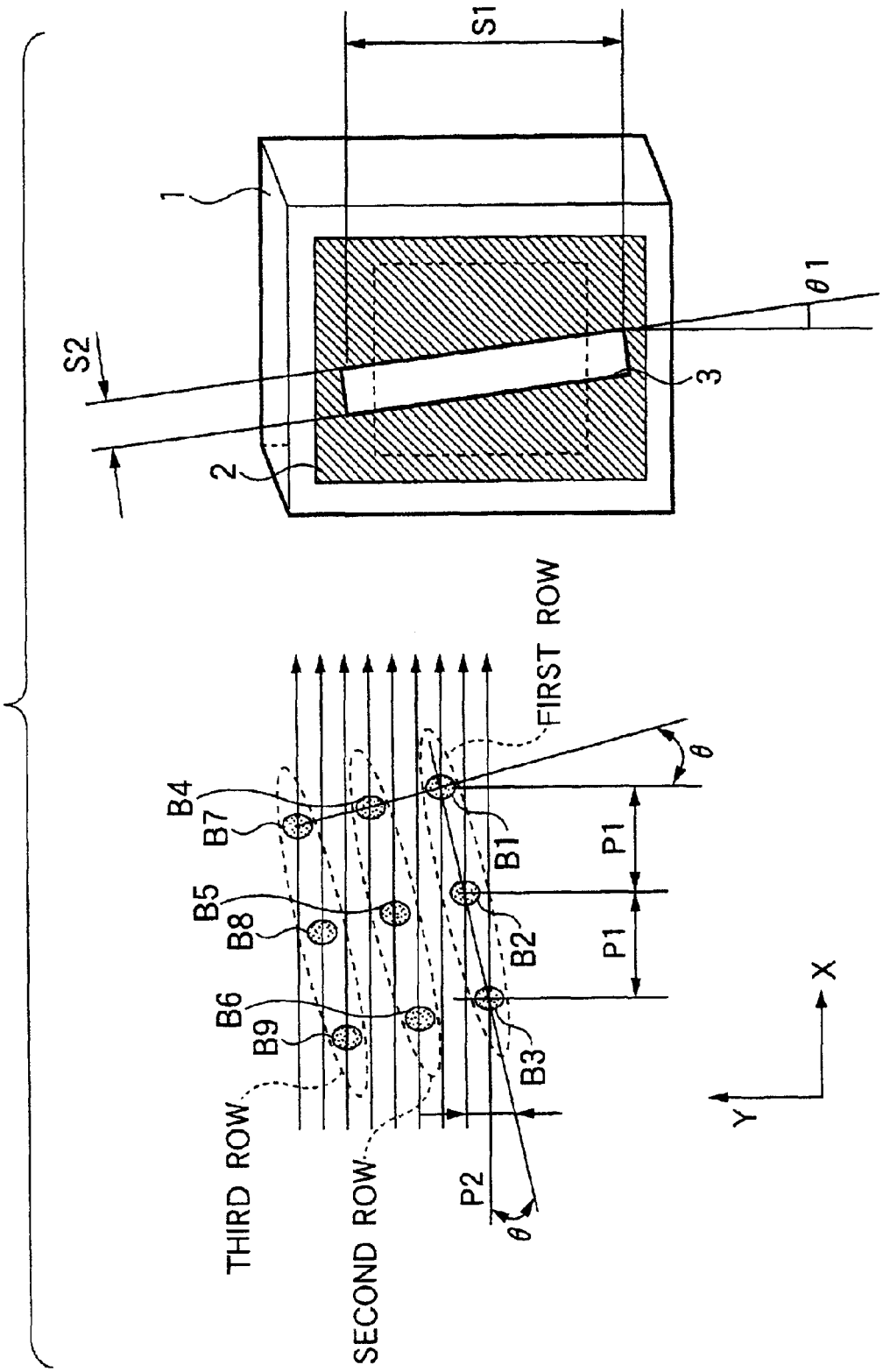
FIG. 1 is a diagram showing one example of beam position arrangement in which scanning on a photoconductor and a beam detector is performed and the beam detector according to an embodiment of the present invention.

FIG. 1 is a diagram showing one example of beam position arrangement in which scanning on the photoconductor 12 and the beam detector 1 is performed and the beam detector 1. As shown in the diagram, beams B1 to B3 of a scanning direction (X direction) of the first row scan at an inclination of θ [=$\tan^{-1}$ (P2/P1)] so that a distance P2 of a sub-scanning direction of each the beam becomes a predetermined distance (becomes about 42 μm for 600 dpi). Also, beams of a sub-scanning direction (Y direction) of the second and subsequent rows scan at an inclination of θ as shown in the diagram. The angle θ of inclination depends on a scale factor of the optical system and arrangement of the semiconductor laser array, and the case of the present example is on the order of 0.5° to 10°.

Figure 2:
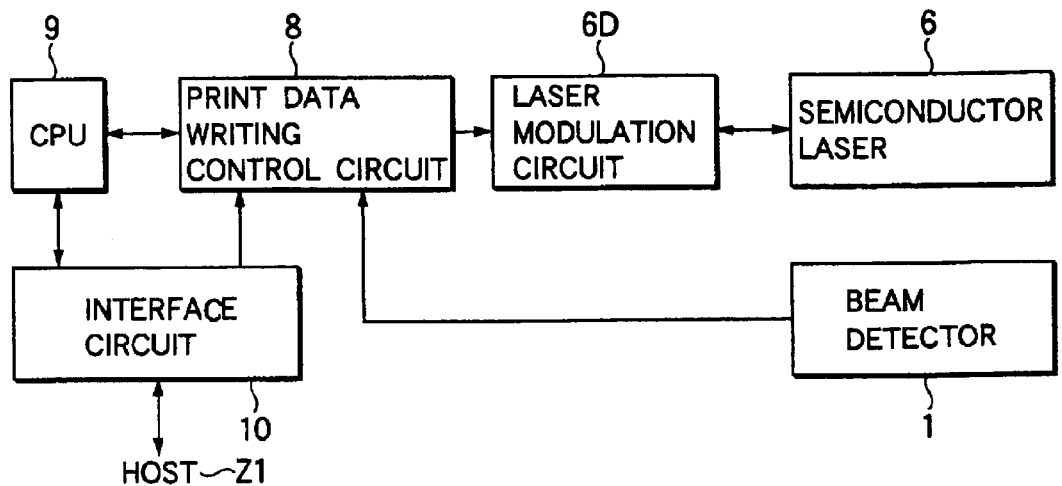
FIG. 2 is a partial block diagram of a laser printer control section.

FIG. 2 is a partial block diagram of a laser printer control section, and has a beam detector 1, a semiconductor laser array 6, a laser modulation circuit 6D, a print data writing control circuit 8, a CPU 9, an interface circuit 10 and so on. It is controlled so that the print data writing control circuit 8 drives and controls the laser modulation circuit 6D for performing optical modulation of the semiconductor laser 6 for image data writing and writes print data of a video image transferred from a host (not shown) into a predetermined position on the photoconductor 12.

A horizontal synchronizing signal obtained by the beam detector 1 is sent out to the print data writing control circuit 8. The interface circuit 10 performs control of an output of status data to the host, receiving of command data and print data from the host and so on.

As shown in FIG. 1, a photodetector 2 made of the high-speed type PIN photodiode is built into the beam detector 1 and a slit 3 is provided in the front and a portion of the photodetector 2 exposed from the slit 3 becomes a light receiving surface (white region) of the beam. The slit 3 inclines at the substantially same angle (θ1) as the slant scanning angle (θ) The angle θ1 of inclination of the slit 3 is desirably equal to the scanning angle θ, but some deviation may occur (details will be described below).

When, for example, nine laser beams B1 to B9 as shown in FIG. 1 scan to the photodetector 2 at an angle of θ, this slit 3 is slantingly mounted at an angle of θ1≈θ, so that the laser beams B1, B4, B7 simultaneously launch within the slit 3 and an optical signal having three beams of light intensity is obtained and is converted into a voltage. This voltage waveform is a signal with very small distortion and this signal is compared with one reference level and a control signal for a writing position is obtained. A control method for determining the writing position will be described below.

In the present embodiment, a description is made as θ1=θ, but since execution is carried out by one reference level, for example, one beam of the laser beams B1, B4, B7 may be detected, so that one beam can be detected when the light quantity overlapping the three beams is not less than the peak light quantity of the one beam at the time of launching into a light receiving surface, with the result that the angle of θ1 may not cause a beam delay of at least beam radius or more. Also, the case of leading in reverse is similar. That is, the following relation expression holds as a range of the angle of θ1.

$$\theta 1 = 0 \pm \tan^{-1}[\text{a beam radius}/(P2 \times \text{the number of beams of a primary scanning direction})]$$

P2 in the expression is a pitch of beams in a sub-scanning direction (Y direction) as shown in FIG. 1.

A slit length Si of the sub-scanning direction is more than or equal to a value in which a beam diameter is added to a value in which a beam distance of a sub-scanning direction (Y direction), for example, a distance between B1 and B4 is multiplied by [(the number of beams of a sub-scanning direction)−1]. As a result of this, all the beams B1, B4, B7 can simultaneously be received within the slit 3.

The subsequent beams B2, B5, B8 and beams B3, B6, B9 of a scanning direction can be split by narrowing a slit width S2 of the primary scanning direction than a value in which a beam diameter is subtracted from a beam pitch P1 of a scanning direction.

Incidentally, when a shape of the photodetector 2 is the same shape as the slit 3, there is no need to provide the slit 3 and the beams can be detected directly by the photodetector 2. In this embodiment, a description in the case of no slit is omitted, but the photodetector 2 of the case of no slit 3 has a shape with S1×S2 shown in FIG. 1, and the beam detector 1 in which the photodetector 2 is mounted maybe directly inclined by θ1.

In the present embodiment, the case of launching the three beams of the sub-scanning direction (Y direction) into the light receiving surface is shown, but in addition, the similar effect can be obtained by launching only the first row or other row of the beams shown in FIG. 1 into the light receiving surface.

Figure 3:
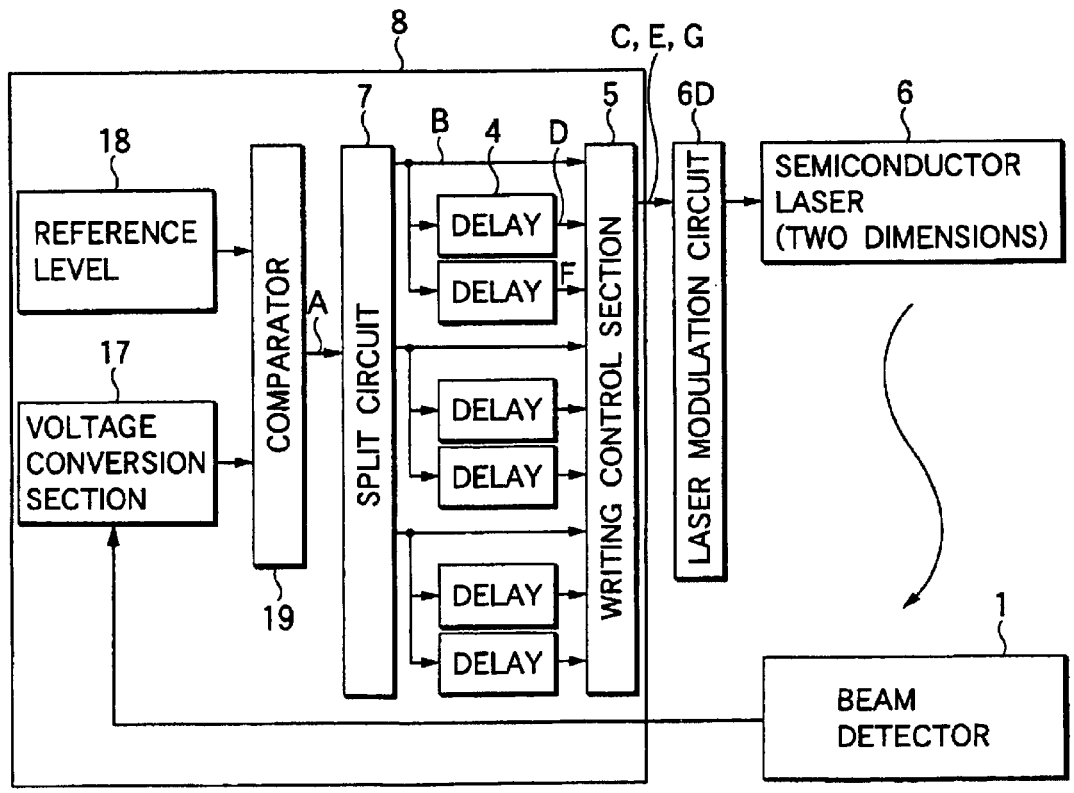
FIG. 3 is a block diagram of a print data writing control circuit.
Figure 5:
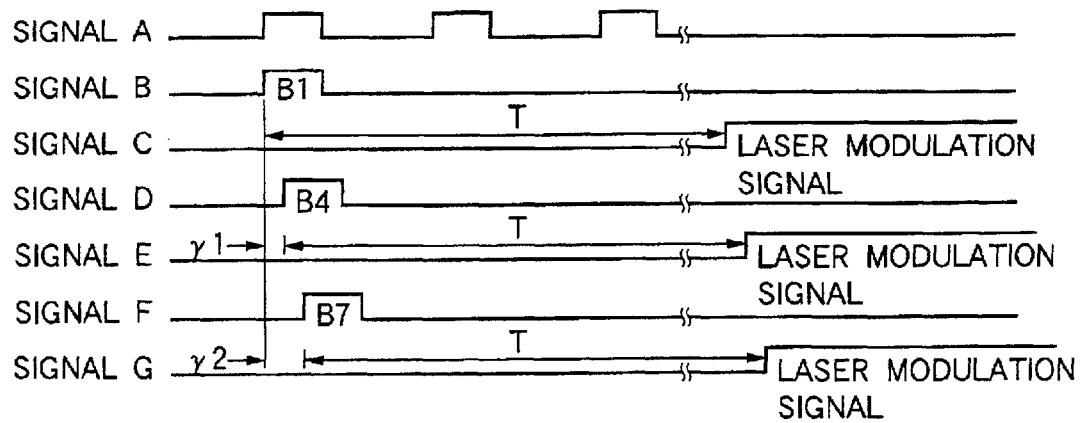
FIG. 5 is a timing chart of each signal A to G shown in FIG. 3.

FIG. 3 is a block diagram of a print data writing control circuit 8, and FIG. 5 is a timing chart of each signal A to G shown in FIG. 3. A method for determining a writing position of each the beam will be described below using FIG. 3 and FIG. 5. Nine beams are emitted from a semi-conductor laser array 6 and by scanning this beam, an optical output is obtained in a beam detector 1. This optical output is inputted to a comparator 19 through a voltage conversion section 17 and is compared with a preset reference level 18 to obtain an A signal.

The A signal sequentially outputs the first rectangular wave signal by the beams B1, B4, B7 and the next rectangular wave signal by the beams B2, B5, B8 and the further rectangular wave signal by the beams B3, B6, B9. Next, the three rectangular waves are split by a split circuit 7 to obtain a B signal as the first rectangular wave by the beams B1, B4, B7. This B signal is used as a writing signal of the beam B1 which is the head beam to obtain this signal and a writing control section 5 and a laser modulation circuit 6D perform modulation of a laser of the beam B1 on a photoconductor 12 by a signal C of print data after time T (laser modulation signal output).

Next, a writing signal of the beam B4 converts a distance delayed with respect to the beam B1 into time $\tau 1$, and a signal D delayed by $\tau 1$ with respect to the B signal is obtained by a delay circuit 4. This signal D is obtained and after time T, modulation of a laser of the beam B4 is performed on the photoconductor 12 by a signal E of print data (laser modulation signal output) Then, a writing signal of the beam B7 converts a distance delayed with respect to the beam B1 into time $\tau 2$, and a signal F delayed by $\tau 2$ with respect to the B signal is obtained by the delay circuit 4. This signal F is obtained and after time T, modulation of a laser of the beam B7 is performed on the photoconductor 12 by a signal G of print data (laser modulation signal output).

As a result of this, positions of the three beams B1, B4, B7 can be aligned on the photoconductor 12 in the sub-scanning direction. Here, the time T for determining a writing position is set to time from a rise signal of the B, D, F signals in FIGS. 4A and 4B, but a fall may be used. By repeating the operations similar to the above operations in the other beams, the beams B1 to B9 can finally be aligned on the photoconductor 12 in the sub-scanning direction.

Figure 4A:
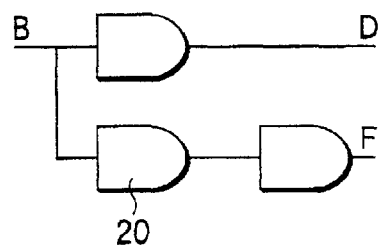
FIGS. 4A and 4B are circuit diagrams showing one example of a delay circuit.
Figure 4B:
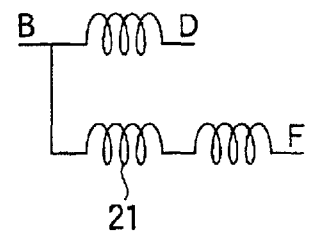

One example of the delay circuit 4 is shown in FIGS. 4A and 4B. The example of FIG. 4A is a circuit using a delay by a gate 20 of an IC, and a delay of one gate 20 becomes several ns to several tens ns, and the number of gates 20 is increased by the necessary delay time. The example of FIG. 4B is a circuit for causing a delay by an inductor 21, and an output of a signal can be delayed by the necessary time by changing a capacity of the inductor 21 or the number of inductors 21.

In the embodiment, other beams are delayed with reference to a signal of the beam B1, but a delay maybe caused with reference to other beams. In this case, since the head beam is B1, it becomes a signal leading by the necessary time with respect to the reference beam signal.

In the embodiment, the beams of the sub-scanning direction are simultaneously detected, but there is no problem even in case of some deviation of the beams. Also, the beam of a particular row can be used as the reference beam.

In the embodiment, a two-dimensional beam configuration with three by three is used as the number of beams, but as long as there is the two-dimensional beam configuration, combinations of the number of beams are arbitrary.

According to the present invention, writing signals of each beam of a two-dimensional semiconductor laser for performing multiple beam scanning can be split by one beam detector to determine a writing position on a photoconductor. Since this configuration is very simple, there is advantageous in that the device can be manufactured at the low costs.

What is claimed is:

1. A two-dimensional beam writing position detecting device, comprising:

an optical system for scanning on a photoconductor by laser beams emitted from a semiconductor laser to form an electrostatic latent image and arranging a plurality of the laser beams in two dimensions and slantingly scanning the plurality of laser beam for forming the electrostatic latent image on the photoconductor at a predetermined angle (θ); and a detector for detecting the plurality of laser beams for determining a first writing position of the plurality of laser beams on the photoconductor, wherein a longitudinal direction of a light beam receiving surface of the detecting device inclines at the substantially same angle (θ1) as the slant scanning angle (θ) with respect to the perpendicular of a scanning direction of the plurality of laser beams.

2. The two-dimensional beam writing position detecting device according to claim 1, wherein the angle (θ1) of inclination of the longitudinal direction in the light beam receiving surface of the detecting device is within a range represented by an expression:

$\theta1 = \theta \pm \tan^{-1}$ [a beam radius/($P2 \times$ a number of beams of a primary scanning direction)]

where P2 in the expression is a beam pitch of a sub-scanning direction.

3. The two-dimensional beam writing position detecting device according to claim 1, wherein a length S1 of a laser beam sub-scanning direction of the light beam receiving surface of the detecting device is greater than or equal to a value in which a beam diameter is added to a value in which a beam pitch P2 of the sub-scanning direction is multiplied by [(a number of beams of the sub-scanning direction)−1], and a length S2 of a laser beam scanning direction of the light beam receiving surface is less than [(a beam pitch P1 of the scanning direction)−(a beam diameter)].

4. The two-dimensional beam writing position detecting device according to claim 1, wherein the light beam receiving surface of the detecting device is partitioned and includes a slit.

5. The two-dimensional beam writing position detecting device according to claim 1, wherein the light beam receiving surface of the detecting device comprises a photodetector.

6. The two-dimensional beam writing position detecting device according to claim 1, wherein a signal, which represents a scanning direction beam of a first row detected by a light beam receiving surface of the detecting device, is formed into a first writing position signal, which represents a scanning direction beam of the first row on a photoconductor, and wherein a second signal, which represents the scanning direction beam of a second row on the photoconductor, is formed into a second writing position signal in which at least one of a delay and a lead is provided so that a scanning direction writing position on the photoconductor of the second row aligns with a scanning direction writing position of the first row on the photoconductor.

7. An image forming apparatus wherein a two-dimensional beam writing position detecting device according to claim 1 is installed in a beam scanning position that is not on a scanning line of the photoconductor.

8. A two-dimensional beam writing position detecting device, comprising:

an optical system for scanning on a photoconductor by laser beams emitted from a semiconductor laser to form an electrostatic latent image and arranging a plurality of the laser beams in two dimensions and slantingly scanning the plurality of laser beams for forming the electrostatic latent image on the photoconductor at a predetermined angle ($\theta$); and a detector for detecting the plurality of laser beams for determining a first writing position of the plurality of laser beams on the photoconductor, wherein a signal, which represents a scanning direction beam of a first row detected by a light beam receiving surface of the detecting device, is formed into a first writing position signal, which represents a scanning direction beam of the first row on a photoconductor, and wherein a seconds signal, which represents the scanning direction beam of a second row on the photoconductor, is formed into a second writing position signal in which at least one of a delay and a lead is provided so that a scanning direction writing position on the photoconductor of the second row aligns with a scanning direction writing position of the first row on the photoconductor.

9. An image forming apparatus wherein a two-dimensional beam writing position detecting device according to claim 7 is installed in a beam scanning position that is not on a scanning line of the photoconductor.

10. A two-dimensional beam writing position detecting device, comprising:

an optical system for scanning a plurality of light beams on a photoconductor to form an electrostatic latent image, arranging the plurality of light beams in two dimensions, and slantingly scanning the plurality of light beams for forming the electrostatic latent image on the photoconductor at a predetermined slant angle ($\theta$) with respect to a scanning direction of the plurality of light beams; and a detector for detecting the plurality of light beams for determining a first writing position of the plurality of light beams on the photoconductor, said detector comprising a light beam receiving surface, wherein a longitudinal direction of the light beam receiving surface is disposed at an angle ($\theta1$) with respect to the scanning direction of the plurality of light beams, and wherein the angle ($\theta1$) is substantially equal to the predetermined slant scanning angle ($\theta$) for simultaneously detecting the plurality of light beams in at least one dimension.

11. The two-dimensional beam writing position detecting device according to claim 10, wherein said detector is disposed in a position of beam scanning that is not within a scanning width of the photoconductor.

12. The two-dimensional beam writing position detecting device according to claim 10, wherein said detector comprises a high-speed PIN photodiode.

13. The two-dimensional beam writing position detecting device according to claim 10, further comprising a print data control circuit for obtaining a writing signal of a scanning direction beam of a first row and a writing signal of a scanning direction beam of a second row.

14. The two-dimensional beam writing position detecting device according to claim 10, further comprising a laser modulation circuit for aligning a writing position of a first row of a scanning direction beam on the photoconductor and a writing position of a second row of a scanning direction beam on the photoconductor in a sub-scanning direction of the photoconductor.

15. The two-dimensional beam writing position detecting device according to claim 13, wherein the print data control circuit comprises a circuit including at least one of a delay circuit and an advancing circuit.

16. The two-dimensional beam writing position detecting device according to claim 15, wherein the circuit including at least one of a delay circuit and an advancing circuit obtains a delayed signal of the writing signal of the scanning direction beam of the second row.

17. The two-dimensional beam writing position detecting device according to claim 15, wherein the circuit including at least one of a delay circuit and an advancing circuit obtains an advanced signal of the writing signal of the scanning direction beam of the second row.

18. The two-dimensional beam writing position detecting device according to claim 16, further comprising a laser modulation circuit for aligning a writing position of a first row of a scanning direction beam on the photoconductor and a writing position of a second row of a scanning direction beam on the photoconductor in a sub-scanning direction of the photoconductor based on the delayed signal.

19. The two-dimensional beam writing position detecting device according to claim 17, further comprising a laser modulation circuit for aligning a writing position of a first row of a scanning direction beam on the photoconductor and a writing position of a second row of a scanning direction beam on the photoconductor in a sub-scanning direction of the photoconductor based on the advanced signal.

20. A two-dimensional beam writing position detecting device, comprising:

an optical system for scanning a plurality of light beams on a photoconductor to form an electrostatic latent image, arranging the plurality of light beams in two dimensions, and slantingly scanning the plurality of light beams for forming the electrostatic latent image on the photoconductor at a predetermined slant angle (θ) with respect to a scanning direction of the plurality of light beams; and a detector for detecting the plurality of light beams for determining a first writing position of the plurality of light beams on the photoconductor, said detector comprising a light beam receiving surface, wherein a longitudinal direction of the light beam receiving surface is disposed at an angle (θ1) with respect to the scanning direction of the plurality of light beams for simultaneously detecting the plurality of light beams, and wherein the angle (θ1) is represented by an expression:

$$\theta1=\theta\pm\tan^{-1}\text{[a beam radius}/(P2\times\text{a number of beams of a primary scanning direction)]}$$

where P2 in the expression is a beam pitch of a sub-scanning direction.

21. The two-dimensional beam writing position detecting device according to claim 20, wherein a length S1 of a light beam sub-scanning direction of the light beam receiving surface of the detecting device is greater than or equal to a value in which a beam diameter is added to a value in which a beam pitch P2 of the sub-scanning direction is multiplied by [(a number of beams of the sub-scanning direction)−1], and a length S2 of a light beam scanning direction of the light beam receiving surface is less than [(a beam pitch P1 of the scanning direction)−(a beam diameter)].

22. A two-dimensional beam writing position detecting device, comprising:

means for scanning on a photoconductor by laser beams emitted from a semiconductor laser to form an electrostatic latent image and arranging a plurality of the laser beams in two dimensions and slantingly scanning the plurality of laser beams for forming the electrostatic latent image on the photoconductor at a predetermined angle (θ); and means for detecting the plurality of laser beams for determining a first writing position of the plurality of laser beams on the photoconductor, wherein a longitudinal direction of a light beam receiving surface of the means for detecting inclines at the substantially same angle (θ1) as the slant scanning angle (θ) with respect to the perpendicular of a scanning direction of the plurality of laser beams.

23. A two-dimensional beam writing position detecting method, comprising:

scanning on a photoconductor by laser beams emitted from a semiconductor laser to form an electrostatic latent image and arranging a plurality of the laser beams in two dimensions and slantingly scanning the plurality of laser beams for forming the electrostatic latent image on the photoconductor at a predetermined angle (θ); and detecting the plurality of laser beams for determining a first writing position of the plurality of laser beams on the photoconductor, wherein a longitudinal direction of a light beam receiving surface of a detecting device inclines at the substantially same angle (θ1) as the slant scanning angle (θ) with respect to the perpendicular of a scanning direction of the plurality of laser beams.

* * * * *